(12) United States Patent
Yu et al.

(10) Patent No.: US 6,620,891 B2
(45) Date of Patent: Sep. 16, 2003

(54) COMPOSITION OF POLYPROPYLENE RESIN

(75) Inventors: Young-Hwan Yu, Ulsan (KR); Young-Ho Im, Seoul (KR)

(73) Assignees: Hyundai Motor Company, Seoul (KR); LG Caltex Co. Ltd., Seoul (KR)

( * ) Notice: Subject to any disclaimer, the term of this patent is extended or adjusted under 35 U.S.C. 154(b) by 187 days.

(21) Appl. No.: 09/931,963

(22) Filed: Aug. 16, 2001

(65) Prior Publication Data

US 2002/0077404 A1 Jun. 20, 2002

(30) Foreign Application Priority Data

Nov. 1, 2000 (KR) .......................... 2000-64688

(51) Int. Cl.$^7$ .......................... C08L 23/00; C08L 23/04; C08L 77/00; C08K 3/26
(52) U.S. Cl. .................. 525/240; 524/427; 524/436; 524/451; 524/515
(58) Field of Search ................ 524/427, 436, 524/451, 500, 502, 515; 525/240

(56) References Cited

U.S. PATENT DOCUMENTS

| 4,758,627 A | * | 7/1988 | Wilkus et al. | ............... 525/194 |
| 6,251,997 B1 | * | 6/2001 | Imai et al. | ................... 525/191 |

\* cited by examiner

*Primary Examiner*—Nathan M. Nutter
(74) *Attorney, Agent, or Firm*—Christie, Parker & Hale, LLP

(57) ABSTRACT

The present invention relates to a polypropylene resin composition comprising an ethylene-propylene copolymer having low molecular weight and an ethylene-propylene copolymer having high molecular weight but both have different constant melt flow rates. This polypropylene resin composition exhibits excellent physical properties such as impact resistance, heat resistance (thermal deformation resistance) and scratch resistance and thus, it can be substitutable for conventional ABS/PC resins and improve reclamation of automotive plastic parts such as housing assembly glove box parts due to deletion of coating process.

5 Claims, No Drawings

COMPOSITION OF POLYPROPYLENE RESIN

CROSS-REFERENCE TO RELATED APPLICATION

This application claims priority of Korea patent Application No. 2000-64688, filed on Nov. 1, 2000.

FIELD OF THE INVENTION

The present invention relates to a polypropylene resin composition comprising an ethylene-propylene copolymer having low molecular weight and an ethylene-propylene copolymer having high molecular weight but both have different constant melt flow rates. This polypropylene resin composition exhibits excellent physical properties such as impact resistance, heat resistance (thermal deformation resistance) and scratch resistance and thus, it can be substitutable for conventional ABS/PC resins and improve reclamation of automotive plastic parts such as housing assembly glove box parts due to deletion of coating process.

BACKGROUND OF THE INVENTION

In general polypropylene resin is widely used in automotive interior parts due to its low cost. This polypropylene resin is about ⅓ price of ABS/PC resins. However, uses of polypropylene resin have been limited to low grade parts of automobiles because of inferior impact resistance, heat resistance and scratch resistance so that, with aims of overcoming such problems, various polypropylene resins which provide improved physical properties have been intensively proposed.

However, conventional polypropylene resins have poor impact resistance, resulting in cracks in the products during real vehicle crash test relating to the requirement tests in North America and Europe, low heat resistance and poor scratch resistance and further require additional coating process of primer compared to ABS/PC resins.

Therefore, polypropylene resins cannot be used for high functionalities of automotive interior parts such as housing assembly glove box even if the price of the conventional resins is ⅓ of ABS/PC.

SUMMARY OF THE INVENTION

The present invention has been completed to add ethylene-propylene copolymers having different molecular weights into the conventional polypropylene polymer composition to be free from the above-mentioned problems created by poor impact resistance, heat resistance and scratch resistance of the conventional polypropylene resins.

An object of the present invention is to provide polypropylene resin composition which can be substituted for 3 times high price of ABS/PC resins by satisfying physical properties required for the parts of automobile housing assembly glove box and deleting coating process which was required for the conventional resins, so that cost and weight can be lowered, and improve reclamation process of plastic parts.

DETAILED DESCRIPTION OF THE INVENTION

The present invention is characterized by polypropylene resin composition comprising:

(i) 20–60 wt. % of ethylene-propylene compolymer having low molecular weight, an ethylene content of from 5 to 20 wt. % and melt flow rate of from 5 to 40 g/10 min;

(ii) 20–60 wt. % of ethylene-propylene compolymer having high molecular weight, an ethylene content of from 5 to 20 wt. % and melt flow rate of from 0.3 to 5 g/10 min; and (iii) 5–40 wt. % of an inorganic filler having a particle size of from 1 to 10 μm.

The present invention is described in more detail as set forth hereunder.

The present invention is characterized by having two-types of ethylene-proplyene compolymers having different molecular weights in the polypropylene resin composition.

It is preferred to use 20–60 wt. % of ethylene-propylene compolymer having low molecular weight and an ethylene content of from 5 to 20 wt. %. Especially, the ethylene-propylene compolymer of the invention has a melt flow rate of from 5 to 40 g/10 min, weight average molecular weight of from 200,000 to 400,000, number average molecular weight of from 50,000 to 80,000 and a specific gravity of from 0.89 to 0.91.

The other ethylene-propylene compolymer having high molecular weight and an ethylene content of from 5 to 20 wt. % is preferably used in the range of from 20 to 60 wt. %. When ethylene-propylene copolymer having high molecular weight is less then 20 wt. %, impact strength is degraded. On the other hand, it is not desired for ethylene-propylene copolymer to exceed 60 wt. %, because when it is more than 60 wt. %, processability is degraded.

The ethylene-propylene compolymer of the invention has a melt flow rate of from 0.3 to 5 g/10 min, weight average molecular weight of from 400,000 to 500,000 and number average molecular weight of from 800,000 to 100,000.

Typical inorganic filler is added to two ethylene-propylene complymers having different molecular weights and examples thereof are talc, barium sulfate and potassium carbonate. It is preferred to use the filler having an average particle size of from 1 to 10 μm and when the particle size is larger than 10 μm, distribution of resin may be degraded and thus, it does not provide the desired physical properties.

Said inorganic filler is used in the range of from 5 to 40 wt. % to the entire polypropylene resin composition. When it is less than 5 wt. %, physical properties such as mechanical strength and rigidity and scratch resistance are inferior. On the other hand, when it is more than 40 wt. %, processability and impact resistance are inferior.

Other additives, used by one having ordinary skill in the art, such as an anti-oxidant, a neutralizer, an anti-static agent, and a nucleating agent may be arbitrarily incorporated in an appropriate content not to obstruct the above-mentioned object of the present invention. Examples of anti-oxidant are phenols, phosphates, and thiodipropionate syilergists and examples of neutralizer are calcium stearate and zinc oxide.

The polypropylene resin composition of the present invention is prepared by means of commonly-known method and it is described briefly hereunder.

Each component is mixed and filled in the hopper of the extrude. After it is supplied with constant ratio into barrels at an appropriate temperature and mixed, it is passed to a condenser, cut and molded with injection molding machine to obtain the desired product. The obtained product is preferred to have a melt flow rate of from 3 to 40 g/10 min. When it is lower than 3 g/10 min, processability may be degraded and flow mark of the product may occur. On the other hand, when it is higher than 40 g/10 min, physical properties such as strength, rigidity, and impact strength become poor.

The final product is prepared by adding other essential additives to the polypropylene resin composition to give master batch powder which is further blended to give pellets. The pellets can be used to manufacture automotive interior parts.

Hereunder is given a more detailed description of the present invention using examples. However, it should not be construed as limiting the scope of this invention.

EXAMPLE 1

A mixture of (i) 40 wt. % of ethylene-propylene compolymer having an ethylene-propylene elastomer content of 14 wt. %, low molecular weight, and melt flow rate of 8 g/10 min; (ii) 40 wt. % of ethylene-propylene compolymer having an ethylene-propylene elastomer content of 14 wt. %, high molecular weight and melt flow rate of 0.5 g/10 min; (iii) 20 wt. % of talc having an average particle size of 3–7 cm; (iv) less than 0.5 wt. % of nucleating agent; and (v) small amount of anti-oxidant was filled into an hopper of double-axis extruder and then mixed by supplying into barrels (200/210/220/230/240) with constant ratio at 210° C. The mixture was passed to a condenser, cut to give pellets and molded by injection molding machine to obtain test specimen.

Comparative Example 1

A mixture of 80 wt. % of ethylene-propylene copolymer having melt flow rate of 8 g/10 min, 20 wt. % of an inorganic filler, less than 0.5 wt. % of nucleating agent, and trace amount of anti-oxidant was followed the same procedure of Example 1 to obtain test specimen.

Comparative Example 2

A mixture of 60 wt. % of ethylene-propylene copolymer having melt flow rate of 8 g/10 min, 20 wt. % of ethylene-propylene rubber, 20 wt. % of an inorganic filler, less than 0.5 wt. % of nucleating agent, and trace amount of antioxidant was followed the same procedure of Example 1 to obtain test specimen.

Experimental Example: Test for physical properties

Physical properties of the obtained specimens prepared from Example 1 and Comparative Examples 1–2 such as melt flow rate, density, tensile strength, elongation, flexural elasticity, flexibility, izod impact resistance, thermal deformation temperature, and scratch resistance were determined and the result was summarized in Table 1.

Test Method

A. Melt flow rate (MI, g/10 min): Tested with ASTM D1238

B. Density (g/cc): Tested with ASTM D1505

C. Tensile strength (kg/cm$^3$) and Elongation (%): Tested with ASTM D638

D. Modulus of bending elasticity (kg/cm$^3$) and Flexural strength (kg/cm$^3$): Tested with ASTM D790

E. Izod impact strength (kg·cm/cm$^2$): Tested with ASTM D256

F. Thermal deformation temperature (° C.): Tested with ASTM D648

G. Scratch resistance: The obtained test specimens were placed in constant temperature and humidity room (temperature of 23±2° C. and humidity of 50±5%) for 40 hrs and cut to be 150 mm×10 mm of length and 0.5–3 mm of thickness. Pencils having different hardness were prepared sharply to have 3 mm length of pencil lead by sharpening with sand paper. The prepared test specimens and pencils were fixed in the pencil scratch hardness tester paper (Toyoseiki, Model: NP). A scratch test was conducted 5 times for each sample. When scratching on the surface was observed twice or more while the test was repeatedly performed 5 times, the pencil used in the test was changed to a pencil having a lead hardness lower by one rank to conduct the same test, whereby the hardness sign of a pencil used at the time the number of times of scratching decreased to less than 2 times was recorded as a pencil hardness. Alternatively, when scratching was observed less than twice while the scratch test was repeatedly performed 5 times, the pencil used in the test was changed to a pencil having a lead hardness higher by one rank to conduct the same test, whereby the hardness sign of a pencil having a lead hardness lower by one rank than a pencil used at the time the number of times of scratching increased to twice or more was recorded as a pencil hardness.

TABLE 1

| Category | | Example 1 | Comparative Example 1 | Comparative Example 2 |
|---|---|---|---|---|
| Melt flow rate (g/10 min) | | 5.1 | 8.2 | 6.7 |
| Density (g/cc) | | 1.04 | 1.03 | 1.03 |
| Tensile strength (kg/cm$^3$) | | 265 | 255 | 280 |
| Elongation (%) | | 114 | 45 | 400 |
| Modulus of bending elasticity (kg/cm$^3$) | | 26600 | 23000 | 17000 |
| Flexural strength (kg/cm$^3$) | | 500 | 420 | 300 |
| Izod impact strength (kg · cm/cm$^2$) | 23° C. | 28.00 | 7.00 | 49 |
| | −10° C. | 6.00 | 4 | 8 |
| Thermal deformation temperature (° C.) | | 132 | 125 | 115 |
| Scratch resistance | Rockwell hardness | 80 | 82 | 55 |
| | Pencil hardness | 4B | 4B | Lower than 6B |

As shown in table 1, the polypropylene resin composition of the present invention provides superior scratch resistance, impact strength and heat resistance to those of the conventional polypropylene resin compositions.

According to the present invention, as described above, the polypropylene resin composition of the present invention have sufficient scratch resistance, impact strength and heat resistance, so that it has excellent properties satisfactorily fit for use in housing assembly glove box parts of automobiles. Therefore, the polyproplyene resin composition can be substituted for ABS/PC which is about 3 times higher in price, lower both cost and weight by eliminating coating process which is required for the conventional products, and improve reproducibility of the plastic parts.

What is claimed is:

1. A polypropylene resin composition comprising:
   (i) 20–60 wt. % of ethylene-propylene compolymer having low molecular weight, an ethylene content of from 5 to 20 wt. % and melt flow rate of from 5 to 40 g/10 min;
   (ii) 20–60 wt. % of ethylene-propylene compolymer having high molecular weight, an ethylene content of from 5 to 20 wt. % and melt flow rate of from 0.3 to 5 g/10 min; and (iii) 5–40 wt. % of an inorganic filler having a particle size of from 1 to 10 μm.

2. The polypropylene resin composition as in claim 1, wherein said ethylene-propylene compolymer having low molecular weight has weight average molecular weight of from 200,000 to 400,000, number average molecular weight of from 50,000 to 80,000, and specific gravity of from 0.89 to 0.91.

3. The polypropylene resin composition as in claim 1, wherein said ethylene-propylene compolymer having high molecular weight has weight average molecular weight of from 400,000 to 600,000 and number average molecular weight of from 80,000 to 100,000.

4. The polypropylene resin composition as in claim 1, wherein said inorganic filler is selected from the group consisting of talc, barium sulfate and potassium carbonate.

5. The polypropylene resin composition as in claim 1, wherein one or more selected from anti-oxidant, a neutralizer, an anti-static agent, and nucleating agent may be added additionally in said polypropylene resin composition.

* * * * *